US011868429B1

(12) United States Patent
Stone et al.

(10) Patent No.: US 11,868,429 B1
(45) Date of Patent: Jan. 9, 2024

(54) TAXONOMIZATION OF FEATURES USED IN PREDICTION MODELS ACCORDING TO SUB-CATEGORIES IN A LIST OF RANKED CATEGORIES

(71) Applicant: Meta Platforms, Inc., Menlo Park, CA (US)

(72) Inventors: Matthew David Stone, Danville, CA (US); Andrew Donald Yates, San Francisco, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 1675 days.

(21) Appl. No.: 15/956,571

(22) Filed: Apr. 18, 2018

(51) Int. Cl.
*G06F 18/2113* (2023.01)
*G06N 20/00* (2019.01)
*G06F 16/9535* (2019.01)
*G06Q 30/0202* (2023.01)
*G06F 18/21* (2023.01)

(52) U.S. Cl.
CPC ...... *G06F 18/2113* (2023.01); *G06F 16/9535* (2019.01); *G06F 18/217* (2023.01); *G06N 20/00* (2019.01); *G06Q 30/0202* (2013.01)

(58) Field of Classification Search
CPC .......................... G06K 9/623; G06F 18/2113
See application file for complete search history.

(56) References Cited

U.S. PATENT DOCUMENTS

| 2014/0365338 A1* | 12/2014 | Liu | G06Q 30/0627 705/26.63 |
| 2016/0203221 A1* | 7/2016 | Rao | G06Q 50/01 707/707 |

* cited by examiner

*Primary Examiner* — Van H Oberly
(74) *Attorney, Agent, or Firm* — Fenwick & West LLP

(57) ABSTRACT

An online system accesses a list of features used as input into a predictor to predict a performance metric for content presented to users. The online system computes importance scores for one or more of the features. A ranked list of categories is created, with each category having one or more sub-categories. For each feature having a computed importance score, the online system assigns, for each attribute in the ranked list of attributes for that feature, the feature to a sub-category in one of the categories in the ranked list of categories that has the same rank as the attribute in the ranked list of attributes for the feature, where the sub-category is associated with a label that corresponds with the attribute. For each sub-category in each category, a cumulative score is computed for the sub-category based on the importance scores of the features of that sub-category.

18 Claims, 3 Drawing Sheets

TAXONOMIZATION OF FEATURES USED IN PREDICTION MODELS ACCORDING TO SUB-CATEGORIES IN A LIST OF RANKED CATEGORIES

BACKGROUND

This disclosure relates generally to large scale online systems having a large number of users, and specifically to taxonomization of features used in prediction models according to sub-categories in a list of ranked categories.

Certain online systems, such as social networking systems, allow their users to connect to and to communicate with other online system users. Users may create profiles on such an online system that are tied to their identities and include information about the users, such as interests and demographic information. The users may be individuals or entities such as corporations or charities. Because of the increasing popularity of these types of online systems and the increasing amount of user-specific information maintained by such online systems, these online systems provide an ideal forum for entities to increase awareness about products or services by presenting content to online system users.

In these online systems, some content items are provided by third party systems for distribution to users of the online system. These may be distributed based on a variety of factors and inputs processed by the online system via a means of predicting the content that may result in the highest performance metrics for the content when it is presented to users (e.g., the performance metric may be to measure a particular user action). However, as the complexity and number of inputs and features grow, although the predictive capabilities of the online system may improve, the actual impact of the different inputs into the predictive systems of the online system become hard to measure, and thus, it becomes increasingly challenging to determine which inputs modify or change to further improve the predictive capabilities of the online system.

SUMMARY

Embodiments include an online system that accesses a list of features used as input into a predictor to predict a performance metric for content presented to users of the online system. Each feature is associated with a ranked list of attributes, each attribute indicating a property of the feature. The online system computes importance scores for one or more of the features in the list of features. The importance scores are computed based on an impact of each feature in influencing the predicted performance metric when used as an input in the predictor. A ranked list of categories is created, with each category having one or more sub-categories.

For each feature having a computed importance score, the online system assigns, for each attribute in the ranked list of attributes for that feature, the feature to a sub-category in one of the categories in the ranked list of categories that has the same rank as the attribute in the ranked list of attributes for the feature, where the sub-category is associated with a label that corresponds with the attribute.

Additionally, for each sub-category in each category, a cumulative score is computed for the sub-category based on the importance scores of the features assigned to that sub-category. The online system ranks the sub-categories within each category according to the cumulative score of each sub-category, and transmits a report to a third party system, the report indicating for each one of the ranked categories the label of the sub-category with the highest cumulative score.

Using such a system, thousands of features may be grouped into a smaller number of categories, with the categories scored in a semantically meaningful way. In practice, a predictor may use over a thousand different features for input. Interpreting and understanding the impact of these features is difficult or infeasible from simply looking at each input feature. However, using the automatic process described herein, the impact of these features on the model's prediction can be more easily determined. This allows a much better understanding of features that are input into a predictor model.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
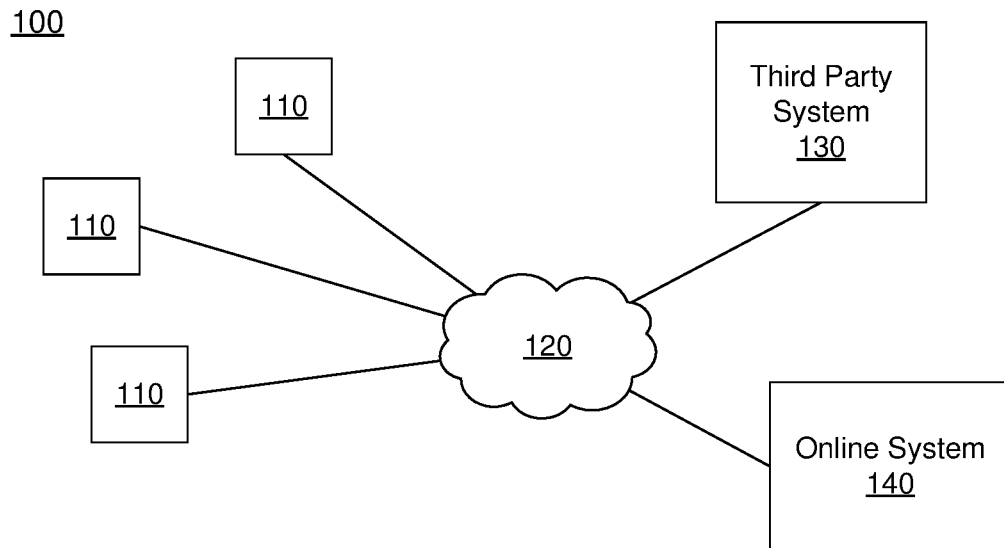
FIG. 1 is a high level block diagram of a system environment for an online system, according to an embodiment.

FIG. 1 is a high level block diagram of a system environment 100 for an online system 140, according to an embodiment. The system environment 100 shown by FIG. 1 comprises one or more client devices 110, a network 120, one or more third-party systems 130, and the online system 140. In alternative configurations, different and/or additional components may be included in the system environment 100. In one embodiment, the online system 140 is a social networking system.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130, such as a content provider system, may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130. Specifically, in one embodiment, a third party system 130 communicates content to the online system 140 for display to users of the client devices 110. The content may be created by the entity that owns the third party system 130. Such an entity may be an advertiser or a company producing a product or service that the company wishes to promote. In another embodiment, the third party system 130 is able to access a user interface of the online system 140 that allows the third party system 130 to view, for different content distribution opportunities, one or more primary factors indicating the reasons for which the content was distributed to certain users, as determined by the online system 140. Additional details regarding this functionality are described below.

Figure 2:
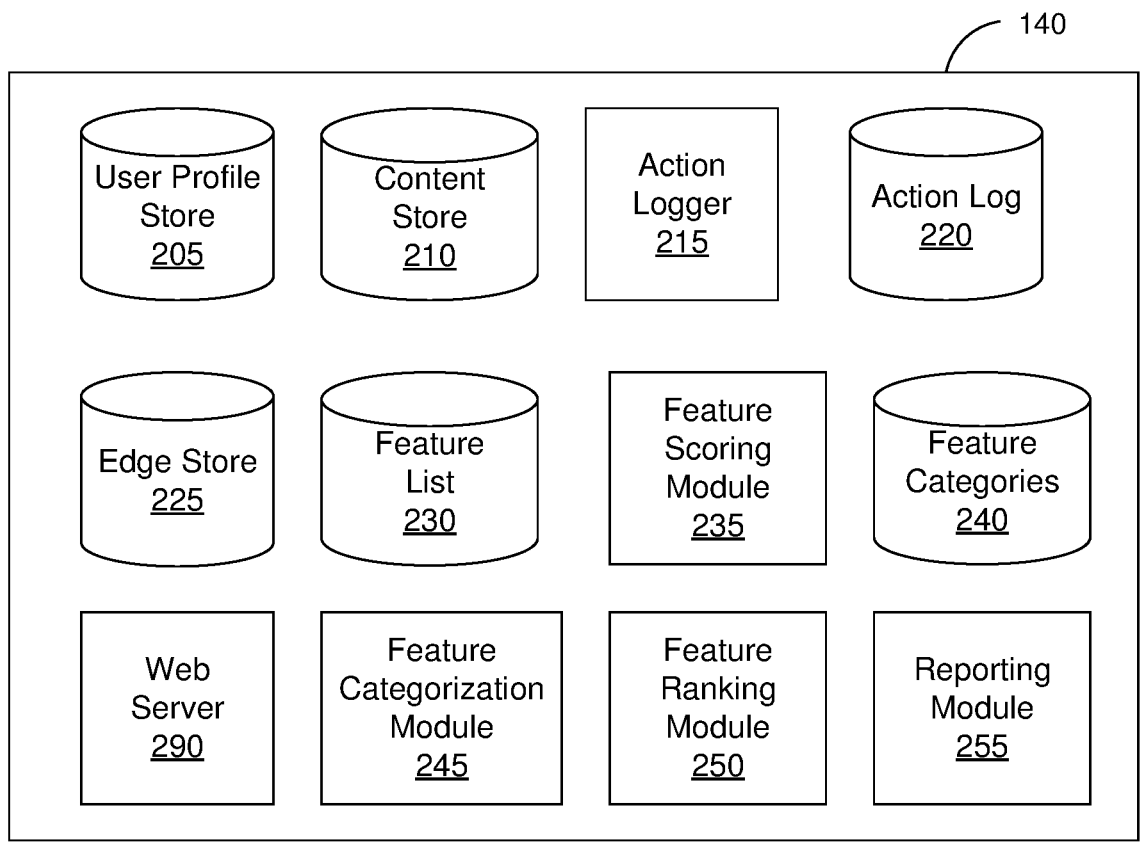
FIG. 2 is an example block diagram of an architecture of the online system, according to an embodiment.

FIG. 2 is an example block diagram of an architecture of the online system 140, according to an embodiment. The online system 140 shown in FIG. 2 includes a user profile store 205, a content store 210, an action logger 215, an action log 220, an edge store 225, a feature list 230, a feature scoring module 235, a feature categories 240, a feature categorization module 245, a feature ranking module 250, a reporting module 255, and a web server 290. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

In one embodiment, the content store 210 may also include content items received from third party systems 130. These content items (e.g., video, audio, text, interactive content, etc.) may be associated with various metadata as selected by the third party system 130. This metadata may include tags describing the content item, features and/or features describing users for which the third party system 130 would like the content items to be distributed to, and in some cases, an indication of a compensation amount to be transmitted to the online system 140 for the opportunity to present the content item to a user of the online system. The features and/or features may describe various profile information of the user, as stored in the user profile store 205 (described above) and/or may describe actions performed by users within and external to the online system 140, as described in the action logger 215 and action log 220 (described below). If a user's profile information or performed actions match these features and/or features, that user may be selected for distribution of the content item. In one case, as described in further detail below, the third party system 130 may also identify a group of seed users and indicates to the online system 140 to distribute the content item to additional users of the online system 140 that are determined by the online system 140 to be similar to the seed users.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing features of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 245 links the online system 140 via the network 120 to the one or more client devices 110, as well as to the one or more third party systems 130. The web server 140 serves web pages, as well as other web-related content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, WEBOS® or RIM®.

Feature List

The feature list 230 includes a list of features which may be used as input into various predictors to make predictions of performance metrics regarding the presentation of content to users of the online system 140 and other activities occurring on the online system 140.

The performance metrics predicted by the online system 140 may relate to various predicted measurements made during the process of determining whether to present a content item from a third party system 130 to a user. For example, these performance metrics may indicate a likelihood of user response to the content item, a similarity of the user to a group of seed users, the value of the user to the third party system 130 (i.e., what kind of benefit, such as return on investment, could the user bring to the third party system 130), how long the user may spend interacting with the third party system 130, how fast a user may respond to the presented content item, what kind of device the user is most likely to use, and so on.

If a performance metric(s) (e.g., similarity to seed users) for a user exceeds a certain threshold, the online system 140 may determine that the associated content item should be selected as a candidate for presentation to the user. Additional performance metrics (e.g., value to the third party system) may be predicted for the candidate content item and other candidate content items from other third party systems 130, and the candidate content item with the highest performance metric may be selected for ultimate presentation to the user.

To determine these performance metrics, the online system 140 accesses the feature list 230, which includes various inputs, i.e., features, which are used by the online system 140 as inputs in its various predictor models to determine the performance metrics. The input features used by each predictor and the configuration of the predictor itself may already be predetermined, such that the predictor may already be trained on a set of training set of input feature data and output labels of the performance metrics. An example of such a process to train a predictor is provided below.

In this example, a third party system 130 may directly or indirectly identify a group of seed users. These seed users represent the types of users to whom the third party system 130 wants to present content items. The online system 140 may identify features associated with these seed users.

After identifying these seed users, the online system 140 identifies features for these seed users. These particular features include data that describes some information related to the seed user. The features for each seed user may describe various actions that a seed user has performed with regard to the online system 140. Examples of such actions may include posts that the user has commented on and links that the user has shared, etc. A feature may include information about the user in the user profile store 205, content store 210, action log 220, and edge store 225. A feature may describe other aspects of the seed user, and may in some cases be provided by the third party system 130.

The features may be selected from a template list of features stored by the online system 140. This template list may include all identifiable features available to the online system 140. This template list may be generated automatically by the online system 140 based on all available system variables of the online system 140 or based on expert selection. The online system 140 may select features from the template list of features that are applicable to the group of seed users. These applicable features may be those that are available or applicable to the seed users.

Examples of these particular features of seed users may include demographic information of users, geographic information of users (e.g., zip code), pages that the user has visited, actions performed in the online system 140 (e.g., liking, posting comments, uploading content, etc.), the user's connections in the online system 140, the user's media consumption history, the user's browsing history including time spent by the user, internal metrics (e.g., data usage, device type usage, etc.), and so on.

The identified features may be used in a predictor as inputs to predict as a performance metric a measure of similarity of other additional users of the online system 140 with the seed users. If one of these additional users is of sufficient similarity, that additional user may be selected as being possibly presented with a content item from the third party system 130. These predictors may include use any type of machine learning model (e.g., a convolutional neural network, random forest, gradient boost decision tree, etc.), statistical model (linear regression, logistic regression, etc.), or other mathematical function, algorithm, device, or other component that is able to model the relationships between one or more input features and an the performance metric (e.g., the measure if similarity).

Other predictors may use other input features different to or in common with those described in the example above. These predictors may also be used to predict different performance metrics and other values as described above. As noted, the input features for these predictors are stored in the feature list 230.

In one embodiment, each feature is associated with a ranked list of attributes. Each attribute in a ranked list of attributes describes a property of the associated feature. For example, the attributes may describe the data source of the data upon which the feature is based (e.g., sourced from activity within the online system, from activity outside the online system, from the third party system, or from the user profile data); 2) what entity is described by the data (e.g., the user, the third party system, or the online system, the content item); 3) the type of action described by the feature, such as those actions described above with reference to the action logger 215 and action log 220 (e.g., actions external to the online system 140, actions within the online system 140, actions related to non-user entities, actions related to users, etc.); 4) a time-related property (e.g., the attribute may indicate how recently the data was collected); 5) a semantic relationship of the data (e.g., is it related to the user, user's interest, an interaction, the content, etc.); 6) a physical device described by the feature (e.g., mobile, desktop, wearable, etc.); and 7) so on.

The attributes for a feature may be determined by an expert system, received from the third party system 130, generated in a collaborative fashion, etc. The attributes are ranked in the ranked list of attributes based on how closely tied they are to the corresponding feature. An attribute that describes a property that most represents the feature may be listed first, with attributes that are in lesser significance ranked lower. The ranking may be determined based on a master ranking list, with the master ranking list indicating which types of attributes should be ranked first, second, and so on, for a feature. For example, a feature indicating a count of the number of user responses to a content item within the last two weeks may include attributes related to "14 day recency", "user data", and "actions on the third party," in this order or some other order.

Additionally, the number of unique attributes that may be assigned to features may be limited. Each category of different properties as described above may have a limited number of different attributes. For example, there may be four attributes describing the data source of the feature, such as those in the example above. Thus, an attribute describing the data source of a feature may be limited to one of these four selections.

Feature Scoring Module

The feature scoring module 235 computes importance scores for features in the feature list 230. The feature scoring module 235 may compute importance scores for all the features in the feature list 230 or only for a subset, such as those features that are currently being used by predictors in the system, or for a single predictor. The feature scoring module 235 may compute feature scoring module 235 using existing weights from associated predictors or generate new importance scores for the features.

In one embodiment, the importance scores for each feature are based on the weights assigned by predictors to the feature during the training process for the predictor in which the feature is an input feature of the predictor. For example, if the predictor is a logistic regression model, the importance score may be the weight for that feature computed by the logistic regression model.

As another example, using the predictor described in the above example for determining similarity between users, the weight of each feature may be associated with the strength of that feature in predicting the measure of similarity between two users. A feature that is strongly correlated to determining the similarity between two users is weighted higher, and vice versa.

The predictor used to determine the similarity between two users may have been trained on historical data, which may include prior presentations of content items to users. The users in this historical data have features associated with them, and these are input into the predictor during the training phase. The output labels used to train the predictor may include a measure of value for that user (e.g., the value of the user to the third party system 130). Those features that are most correlated with an increase in value may thus be weighted higher by the predictor at the end of the training phase. Note that the features selected as input to the predictor may depend upon the features identified to be present in the seed users.

The feature scoring module 235 accesses the weight values produced by predictors, such as the one described in the example above, for corresponding features, and assigns an importance score to the features based on these weights. If one feature has multiple weight values from multiple predictors, because the feature is used as an input to multiple predictors, the feature scoring module 235 may sum all the weights for the feature into a single value to create the importance score. If, in this multiple predictor scenario, the number of predictors using each feature vary, the feature scoring module 235 may normalize the resulting importance scores. Note that although the importance scores are described in terms of multiple predictors, the feature scoring module 235 may in some cases only use the weights from a single predictor, along with the features used for that predictor, to determine importance scores for features for that one predictor.

In another embodiment, the feature scoring module 235 generates novel importance scores for the features (either all the features or the subset). The feature scoring module 235 may generate the importance score for a feature based on how many predictors use that feature as an input. The feature scoring module 235 may run statistical models on input features and the output of predictors to determine the weights for each feature. For example, the feature scoring module 235 may run a linear regression upon the values of input features of a predictor and the output values generated by that predictor using those input features. The absolute value of the weight of these features as determined by the linear regression may then be used directly or modified to create the importance score for each of the input features. The feature scoring module 235 may also receive an importance score value from the third party system 130 for features, or from an expert system.

After determining the importance scores for the one or more features in the feature list 230, the feature scoring module 235 associates each of the one or more scored features with its importance score.

Feature Categories

The feature categories 240 includes a ranked list of categories, with each category further including one or more sub-categories. The categories are ranked in a specific order. The number of categories may correspond to the largest number of attributes in a ranked attribute list of any one of the features with a computed importance score. For example, if the largest ranked attribute list among all the features is five attributes, then there may be five categories. Each sub-category in each category is associated with a label corresponding to an attribute. The labels for each sub-category in each category are unique, and thus each sub-category has a one-to-one relationship with an attribute in each category. In other words, the sub-categories in a single category do not have any mutually shared labels.

As further described below, the feature categorization module 245 categorizes the features described above into one or more of the categories based on the attributes in the ranked list of attributes for each feature. As different features may have the same attributes, each sub-category in each category may be assigned with multiple features.

Feature Categorization Module

The feature categorization module 240 categorizes each feature into sub-categories within main categories based on the ranked list of attributes associated with each feature.

For each feature having a computed importance score, the feature categorization module 240 iterates through each attribute in the ranked list of attributes for that feature. For each of these attributes, the feature categorization module 240 assigns the feature to a sub-category in a category in the ranked list of categories that has the same rank as the rank of the attribute in the ranked list of attributes for that feature. Furthermore, the sub-category that the feature is assigned to has a label that matches the attribute.

Thus, for example, if a feature has three attributes ranked as: 1) attribute A, 2) attribute B, and 3) attribute C, these would be placed in 1) category I, 2) category II, and 3) category III, respectively. Furthermore, in category I, the feature would be placed in a sub-category labeled with attribute A. In category II, the feature would be placed in a sub-category labeled with attribute B. In category III, the feature would be placed in a subcategory labeled with attribute C.

Note that when assigning the feature to a category, the feature itself is assigned, and not any values represented by the feature. Thus, for example, a feature may be a user's zip code. When that feature is assigned to a sub-category, it is the feature itself (i.e., its label) that is assigned rather than any actual zip code value.

If a sub-category with a label matching the attribute of the feature to be assigned to the category does not exist, a new sub-category with a label matching the attribute is added to the category. For example, if a category has a sub-category for "user data sourced features" and a sub-category for "third party system sourced features," and a feature is to be added to the category based on an attribute that is "offline data sourced features," a new sub-category is created in the category with the label "offline data sourced features," and the feature is assigned to this sub-category.

As multiple features may share the same attributes placed in the same rank position, each sub-category in each category may be assigned with multiple features. This creates a hierarchy of ranked categories, sub-categories labeled with attributes within each category, and features within each sub-category having a particular attribute matching the label for the sub-category. Furthermore, the particular attribute has a rank in the ranked list of attributes for its feature that matches the rank of the category in which that feature has been assigned.

Feature Ranking Module

The feature ranking module 250 ranks the sub-categories within each category according to the importance scores of the features within each sub-category. The feature ranking module 250 make take the importance scores of all the features within a sub-category and sum them together to determine a cumulative score for each sub-category. After computing a cumulative score for each sub-category, the feature ranking module 250 ranks the sub-categories in each category according to their respective cumulative scores.

For example, a category may include 3 sub-categories, which may be labeled as 1) user (feature related to user), 2) 7 day recency (features regarding data collected within last 7 days), 3) client (feature related to the client device and not the server). Within the first sub-category of "user," 5 different features may have been assigned. For example, one feature may be the user's age. Each of these features has an importance score computed by the feature scoring module 235. The feature ranking module 250 sums the importance scores of all the features in each category to arrive at a cumulative score for each sub-category. For example, the user sub-category may have a cumulative score of 10, while the 7 day recency sub-category may have a cumulative score of 20, and the client sub-category may have a cumulative score of 5. This indicates that for this particular category (i.e., at this rank), the 7 day recency attribute has a highest cumulative score. As described below, some or all of this information may be presented in a report by the reporting module 255.

In another embodiment, instead of adding the importance scores to generate an importance score for each sub-category, the feature ranking module 250 may first modify the importance score for each feature based on the attribute of the feature that caused that feature to be assigned to the sub-category. In other words, the attribute of the feature that has the same rank as the category under which the sub-category exists. For example, different attributes may be given different weights. These weights may be used to modify the importance score for a feature, and this modified importance score is used to generate the cumulative score for a sub-category (e.g., by adding all the modified importance scores of features in a sub-category). The rank of the attribute for that feature may be used as a modifier for the importance score. Some other characteristics of the attribute may also be used. For example, different combinations of features and attributes may be associated with different modifier values which are used to first modify the importance score before using it to compute the cumulative score.

In another embodiment, instead of adding the importance scores to generate the cumulative scores, the feature ranking module 250 may perform some other mathematical operation, such as averaging, determining the median, determining the statistical deviation, variance, or other characteristic of the importance scores of features in each sub-category, and uses this computed value as the cumulative score. The feature ranking module 250 may also normalize the importance scores to a scale (e.g., 0-100 scale) before combining them together to generate the cumulative score, or may normalize the cumulative scores after they are computed.

Reporting Module

The reporting module 255 transmits reports of the results of the classification and ranking of the features into the categories and sub-categories to the third party system 130, for use in the online system 140, to users, or to other sources.

The reporting module 255 may report the top sub-categories in each category and their cumulative scores. The reporting module 255 may report the differences in the cumulative scores of top sub-categories of each category, thus providing a comparison between the categories. The reporting module 255 may also report the labels associated with the top sub-categories, as well as the features within each sub-category. As the features that have been categorized may only be for a single predictor, this information can be used to determine which features or attributes of features most strongly impact the results of a predictor. This can in turn be used to understand why a predictor produces certain results because it is known what types of input features affect the predictors the most. This may also be used to improve the results of the predictors, as those feature with attributes matching the ones labeled in the top sub-categories may be features of interest that should be included as input features in the predictors, while those features with attributes not appearing in the top reported sub-categories may be removed.

Examples of different types of reports that may be generated by the reporting module 255 are provided below.

In one example, a report may indicate that the user data features contribute to a particular percentage to the prediction made by a predictor model. The percentage is determined by determining what percentage of the total cumulative score of the highest ranked subcategories is from sub-categories with labels indicating "user data".

In one example, a report may indicate a cumulative score of a sub-category with a label corresponding to an attribute related to user interaction with pages, and the report may also indicate the cumulative scores of the other sub-categories.

In one example, a report may indicate that a predictor shows that a user responding to a content item is influenced by 14% by the user being presented with the content item more than once. This report may be derived by the reporting module 255 by determining that the cumulative scores of sub-categories with labels associated with a retargeting attribute comprise 14% of the total cumulative score of all the sub-categories in a categorization of the features of a predictor that predicts whether a user will respond to being presented with a content item from a third party system. Note that 14% is provided as an example and any other values are also possible.

In one example, a report may indicate that features provided by the third party system (i.e., with an attribute that indicates third party source) contribute a certain percentage to the outcome of a predictor. The percentage may be computed by determining the ratio of the cumulative score of a top ranked sub-category with a label associated with the third party source attribute, compared to the cumulative scores of the other top sub-categories.

In one example, a report may indicate that features with certain attribute types provide a percentage increase in the accuracy of predicting a performance metric for a predictor, where the performance metric is an internal measurement for the online system. For example, the performance metric may measure overall user response to content items presented from all third party systems, rather than a single third party system as would be the case with a predictor for a single third party system. The percentage increase may be determined by comparing the cumulative score of a sub-category with an attribute of the features in question with the cumulative scores of the other sub-categories.

In another example, a report could indicate the top scoring sub-category label for a predictor that determines if user should be presented with a content item. For example, the top scoring sub-category may be associated with an attribute that indicates features that are related to a user's browsing history. This may indicate that a user was selected for presentation of the content item likely due to some information in the user's browsing history.

Other reports may be created focusing on other attributes that are associated with sub-category labels, such as offline or sparse data source features, internal online system data features, and so on. Additional elements that may be presented by the reporting module 255 in reports may include aspects of the content, independent of the user, and reports regarding the content. Furthermore, the dimension of the characteristics of the data itself (e.g., how many categories, average values, etc) may also be presented in a report.

The reporting module 255 may present such reports to third party systems 130, internally within the online system 140 (e.g., to an administrator), or to a user of the online system. These reports can provide insight to these different parties as to why a predictor performed in a particular way, why a particular prediction was made, how to possibly improve the prediction by adding or removing certain features with certain attributes, and so on.

Exemplary Advantages

Such a categorization and taxonomization process as described herein provides many exemplary advantages. In practice, a predictor may use over a thousand different features for input. Interpreting and understanding the impact of these features is difficult or infeasible from simply looking at each input feature. However, using the automatic process described above, thousands of features may be grouped into a smaller number of categories, with the categories scored in a semantically meaningful way. This allows a much better understanding of features which are input into a predictor model, such as a machine learning model. Furthermore, such a process is highly scalable over an arbitrary number of features and predictors, and does not require reconfiguration for each combination of input features and predictor used.

For example, the input features to different predictors (e.g., for different third party systems) could be compared to see why one predictor might have a higher accuracy at predicting a performance metric compared to the other predictor. The impact of different features with different attribute types could be estimated using measurable numbers (i.e., the cumulative scores) rather than based on some intuition. Furthermore, by also measuring the impact of features of different attributes rather than just the features themselves, additional features sharing the same attributes can be added or removed as input to the predictor to improve the predictive accuracy of the predictor. For example, if features of a particular attribute have a large impact on the performance of the predictor, as indicated by a top scoring sub-category, additional features having the same attributes may be added as input features to the predictor (with the predictor being retrained on this new set of input features).

Such classification of the input features may assist the third party system 130, online system 140, and even the user in gathering more information, and with this additional information, potentially improving the predictive models of the online system that use the classified features. For example, a third party system, based on information regarding which feature attributes provide high cumulative scores in the classification process, may be able to transmit additional customized feature data to the online system that also share the same attributes.

Data Flow Diagram Illustrating Taxonomization of Input Features

Figure 3:
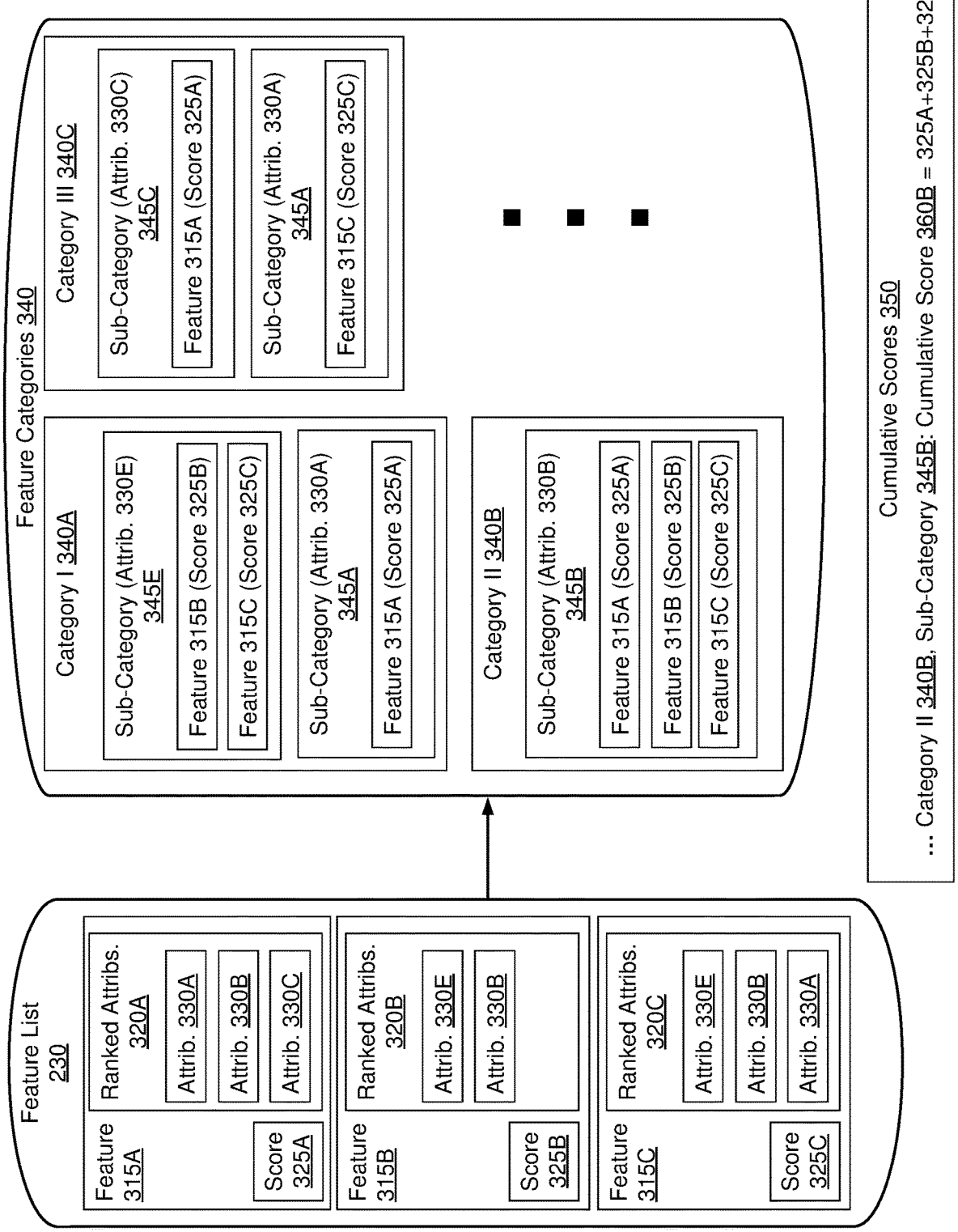
FIG. 3 is a combined data structure and data flow diagram illustrating the taxonomization process described herein, according to an embodiment.

FIG. 3 is a combined data structure and data flow diagram illustrating the taxonomization process described herein, according to an embodiment. In other embodiments, the process may include different and/or additional steps than those described in conjunction with FIG. 3. Additionally, in some embodiments, the process may be performed in a different order than the one described in conjunction with FIG. 3.

Initially, the online system 140 generates or accesses the feature list 230. Furthermore, the feature scoring module 235 generates scores for each of the features in the feature list 230. In the illustrated example, the features include features 315A-C with scores 325A-C, respectively. Note that although only three features are shown here for the purposes of clarity, in practice the feature list 230 may have thousands of features. These features may represent any data that may be present in the online system 140, and which may be sourced from the online system 140 itself, from the third party system 130, from offline sources (e.g., sparse data), from users of the online system 140, from other external sources, and so on. These features may describe something about the user, the online system 140, the third party system 130, and so on. The features in the feature list 230 may be features used in a single predictor, or features used in multiple predictors.

Each feature 315 in the feature list 230 also includes a ranked list attributes. Here, the ranked list of attributes for the features 315A-C is represented by the ranked attributes 320A-C, respectively. Each ranked list of attributes 320 for each feature 315 may include one or more attributes 330 which describe various properties for the attribute (as noted above). For, example, an attribute could indicate that the feature is sourced from user data. Although two to three attributes 330 are shown per feature 315 in the illustrated example (e.g., feature 315A has attributes 330A-C), in practice each feature may have a different number of attributes.

The feature categorization module 245 takes the features in the feature list 230 and categorizes them into the feature categories 240. As noted above, for each feature, the feature categorization module 245 places the feature in the first category in the feature categories 340, which is ranked, and places that feature in a sub-category of that category that matches the first attribute in the ranked list of attributes for that feature. Thus, in the illustrated example, feature 315A is placed in sub-category 345A of category I 340A. Here, sub-category 345E has a label matching the attribute 330A, which is the first attribute in the ranked attributes 320A for feature 315A.

The feature categorization module 245 continues with second attribute of the feature, and places it in the second ranked category in the sub-category matching the attribute. Thus, feature 315A is further placed in the subcategory 345B, which is associated with attribute 330B, in the category II 340B, which is the second ranked category.

The feature categorization module 245 continues in the same fashion with the third attribute, fourth, and so on, until all the attributes are parsed. If a feature is to be placed in a category that does not exist, the feature categorization module 245 may create the category. Here, feature 315A has a remaining attribute 330C that is ranked third, and thus is placed in the sub-category 345C (corresponding to attribute 330C), in the third ranked category III 340C.

The same process is repeated by the feature categorization module 245 for each feature. In the illustrated example, this results in feature 315B being placed in sub-category 345E of category I 340A and sub-category 345B of category II 340B, while feature 315C is placed in sub-category 345E of category I 340A, sub-category 345B of category II 340B, and sub-category 345A of category III 340C. Note that the same attributes may be shared between different features, but may not be in the same rank across different features.

After categorizing all the features, the feature ranking module 250 may rank the sub-categories in each category. The feature ranking module 250 does this by adding the importance scores of the features in each sub-category to generate cumulative scores for each sub-category. Each sub-category's cumulative score is compared with other cumulative scores of other sub-categories, and the sub-categories within each category are ranked according to their cumulative scores. For example, the cumulative score 360B for sub-category 345B (in category II 340B) is the sum of the scores 325A+325B+325C (as shown at 350). These importance scores correspond to the three features 315A-C which are part of the sub-category 345B. The other cumulative scores for the other sub-categories are computed in the same fashion.

These scores, the rankings of the sub-categories, the attributes associated with each sub-category, and other data may be reported to the user, the online system 140, or the third party system 130 via the reporting module 255, as described above.

Exemplary Flow

Figure 4:
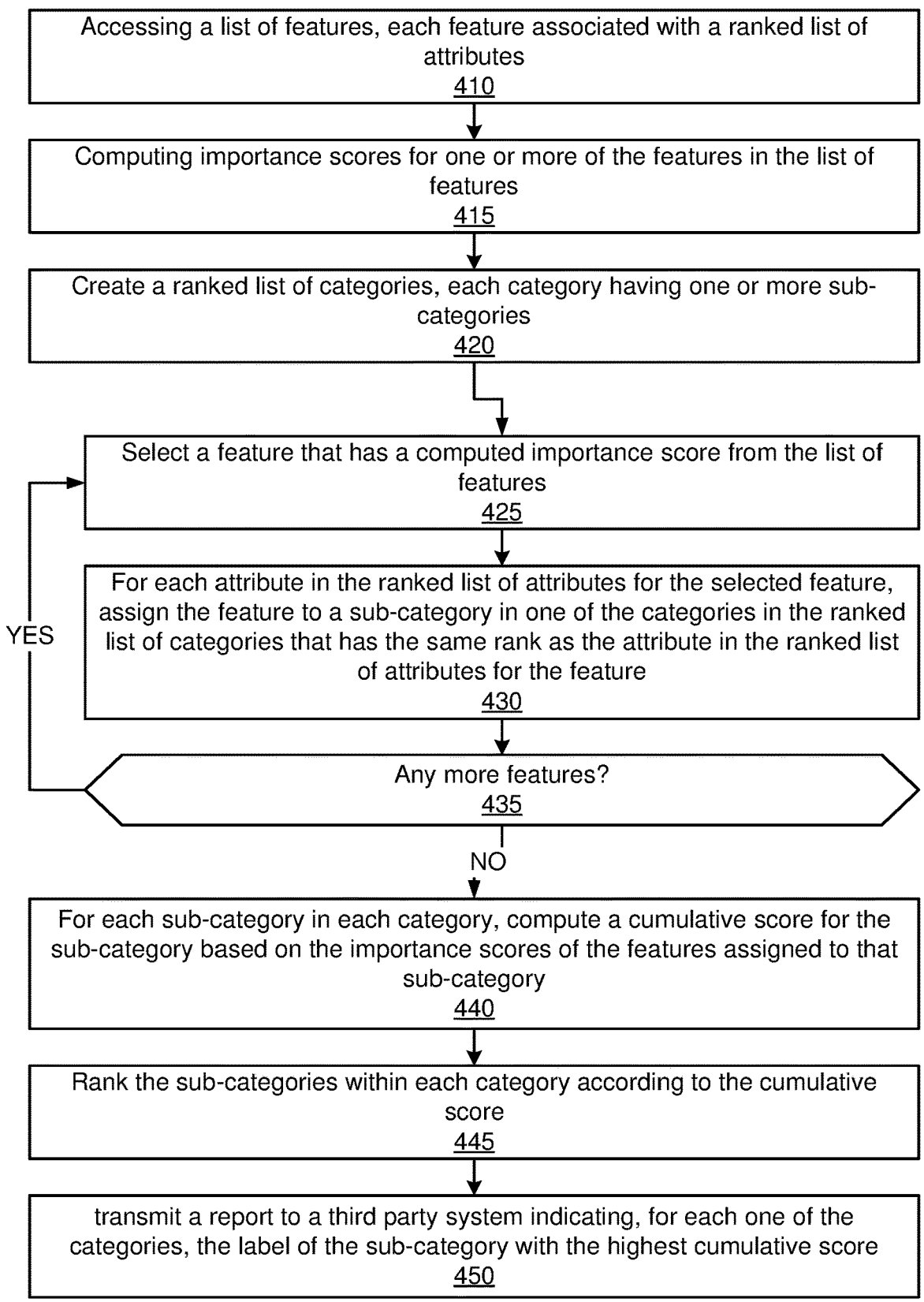
FIG. 4 is a flowchart of one embodiment of a method in an online system for the process of taxonomizing different features into categories and sub-categories by attribute, according to an embodiment.

FIG. 4 is a flowchart of one embodiment of a method in an online system for the process of taxonomizing different features into categories and sub-categories by attribute, according to an embodiment. In other embodiments, the process may include different and/or additional steps than those described in conjunction with FIG. 4. Additionally, in some embodiments, the process may be performed in a different order than the one described in conjunction with FIG. 4.

Initially, the online system 140 accesses 410 a list of features. These features are used as input into one or more predictors to predict performance metrics of content presented to users of the online system. Each feature associated with a ranked list of attributes, with each attribute indicating a property of the feature.

One example of a predictor is a machine learning model that generates a performance metric that determines the likelihood that a user may respond to content items from the third party system 130 that are distributed to the user. The attributes may indicate the data source used to generate the feature, the recency of the data used in feature, and the semantic relationship of the data. The list of features may number in the thousands.

The online system 140 computes 415 importance scores for one or more of the features in the list of features. These importance scores are computed based on an impact of each feature in influencing the predicted performance metrics when used as an input in the one or more predictors. These importance scores may be based on the same weights determined by each predictor for the corresponding features. The online system 140 may also instead determine these importance scores separately by determining the correlation between input features for a predictor and the output performance metric for the predictor, with a higher correlation indicating a higher importance score for that feature.

The online system creates 420 a ranked list of categories with each category having one or more sub-categories. The number of ranked categories may equal the number of ranked attributes of the feature with a computed importance that has the largest number of attributes. The ranking of the categories corresponds to the ranking of the attributes in each feature. Thus, the first ranked category is associated with the first ranked attribute, and so on, as described below.

The online system 140 selects 425 a feature that has a computed importance core from the list of features.

For each attribute in the ranked list of attributes for that feature, the online system assigns 420 the feature to a sub-category in one of the categories in the ranked list of categories that has the same rank as the attribute in the ranked list of attributes for the feature. The sub-category that the feature is assigned to is associated with a label that corresponds with the attribute.

The online system 140 continues assigning features until it determines 435 that there are no more features left to assign. Once this occurs, for each sub-category in each category, the online system computes 440 a cumulative score for the sub-category based on the importance scores of the features assigned to that sub-category. The cumulative score for each sub-category could be computed by adding the importance scores of the features in each sub-category. In another case, it could be computed by first modifying the importance score of each feature by the rank, type, or other characteristic of the attribute of the feature which has a rank corresponding to the rank of the category in which the sub-category exists.

The online system 140 ranks 445 each of the sub-categories within each category according to the cumulative score of that sub-category. Thus, the sub-category with the highest cumulative score is ranked first within a category, the sub-category with the second highest cumulative score is ranked second, and so on.

The online system 140 transmits 450 a report to a third party system, with the report indicating for each one of the ranked categories the label of the sub-category with the highest cumulative score. Thus, the online system 140 is indicating to a third party system 130 what types of attributes for features may have been most significant in impacting the accuracy of a predictor or predictors. The online system 140 may also transmit reports to users to provide information to users as to why they may have been selected for distribution of a content item. Additionally, the online system 140 may feed this information back into its own systems to improve the results of predictors by modifying the input features for these predictors based on the report.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    accessing, by an online system, a list of features, the features used as input into a predictor to predict a performance metric for content presented to users of the online system, each feature associated with a ranked list of attributes, each attribute indicating a property of the feature;
    computing importance scores for one or more of the features in the list of features, the importance scores computed based on an impact of each feature in influencing the predicted performance metric when used as an input in the predictor;
    creating a ranked list of categories, each category having one or more sub-categories;
    for each feature having a computed importance score:
        for each attribute in the ranked list of attributes for that feature, assigning the feature to a sub-category in one of the categories in the ranked list of categories that has the same rank as the attribute in the ranked list of attributes for the feature, wherein the sub-category is associated with a label that corresponds with the attribute;
    for each sub-category in each category, computing a cumulative score for the sub-category based on the importance scores of the features assigned to that sub-category;
    ranking the sub-categories within each category according to the cumulative score of each sub-category;
    transmitting a report to a third party system, the report indicating for each one of the ranked categories the label of the sub-category with the highest cumulative score; and
    transmitting a notification to a user of the online system, the notification indicating the label of the sub-category with the highest cumulative score in the highest ranked category.

2. The method of claim 1, wherein the predictor is a machine learning model that generates a performance metric that determines the likelihood of a user responding to content items from the third party system that are distributed to the user.

3. The method of claim 1, wherein the attributes indicate at least one of a data source used to generate the feature, a recency of the data used in feature, and a semantic relationship of the data used in the feature.

4. The method of claim 1, wherein the importance scores are the weights determined by the predictor for the corresponding features.

5. The method of claim 1, wherein the importance score for a feature is computed by:
    determining a correlation between the value of the input feature for the predictor and the value of a performance metric for the predictor; and
    assigning an importance score to a feature in proportion to the amount of corresponding correlation.

6. The method of claim 1, wherein the number of ranked categories is equal to the number of ranked attributes of a feature with a computed importance that has the largest number of attributes.

7. The method of claim 1, wherein the cumulative score for each sub-category is computed by:
    modifying the importance score of each feature in each sub-category based on the rank and type of the attribute of each feature which has a rank corresponding to the rank of the category in which the sub-category exists; and
    adding the modified importance scores of the features in each sub-category to generate the cumulative score.

8. The method of claim 1, further comprising:
    providing a report indicating a percentage increase in the accuracy of a predictor due to features of a particular attribute based on the cumulative score of a sub-category with a label matching that attribute compared to a total cumulative score of the other sub-categories.

9. The method of claim 1, further comprising:
    selecting an input feature from the input features for a single predictor that has a highest ranked attribute matching the label of a highest ranked sub-category;
    selecting additional features that are external to the list of features for the predictor that having a highest ranked attribute matching the label of the highest ranked sub-category; and
    re-training the predictor to include the additional features as input features.

10. A computer program product comprising a non-transitory computer readable storage medium having instructions encoded thereon that, when executed by a processor, cause the processor to:
- access, by an online system, a list of features, the features used as input into a predictor to predict a performance metric for content presented to users of the online system, each feature associated with a ranked list of attributes, each attribute indicating a property of the feature;
- compute importance scores for one or more of the features in the list of features, the importance scores computed based on an impact of each feature in influencing the predicted performance metric when used as an input in the predictor;
- create a ranked list of categories, each category having one or more sub-categories;
- for each feature having a computed importance score:
  - for each attribute in the ranked list of attributes for that feature, assign the feature to a sub-category in one of the categories in the ranked list of categories that has the same rank as the attribute in the ranked list of attributes for the feature, wherein the sub-category is associated with a label that corresponds with the attribute;
- for each sub-category in each category, compute a cumulative score for the sub-category based on the importance scores of the features assigned to that sub-category;
- rank the sub-categories within each category according to the cumulative score of each sub-category;
- transmit a report to a third party system, the report indicating for each one of the ranked categories the label of the sub-category with the highest cumulative score; and
- transmit a notification to a user of the online system, the notification indicating the label of the sub-category with the highest cumulative score in the highest ranked category.

11. The computer program product of claim 10, wherein the predictor is a machine learning model that generates a performance metric that determines the likelihood of a user responding to content items from the third party system that are distributed to the user.

12. The computer program product of claim 10, wherein the attributes indicate at least one of a data source used to generate the feature, a recency of the data used in feature, and a semantic relationship of the data used in the feature.

13. The computer program product of claim 10, wherein the importance scores are the weights determined by the predictor for the corresponding features.

14. The computer program product of claim 10, wherein the non-transitory computer readable storage medium has further instructions encoded thereon for the computation of the importance score that, when executed by a processor, cause the processor to:
- determine a correlation between the value of the input feature for the predictor and the value of a performance metric for the predictor; and
- assign an importance score to a feature in proportion to the amount of corresponding correlation.

15. The computer program product of claim 10, wherein the number of ranked categories is equal to the number of ranked attributes of a feature with a computed importance that has the largest number of attributes.

16. The computer program product of claim 10, wherein the non-transitory computer readable storage medium has further instructions encoded thereon for the computation of the cumulative score for each sub-category that, when executed by a processor, cause the processor to:
- modify the importance score of each feature in each sub-category based on the rank and type of the attribute of each feature which has a rank corresponding to the rank of the category in which the sub-category exists; and
- add the modified importance scores of the features in each sub-category to generate the cumulative score.

17. The computer program product of claim 10, wherein the non-transitory computer readable storage medium has further instructions encoded thereon that, when executed by a processor, cause the processor to:
- provide a report indicating a percentage increase in the accuracy of a predictor due to features of a particular attribute based on the cumulative score of a sub-category with a label matching that attribute compared to a total cumulative score of the other sub-categories.

18. The computer program product of claim 10, wherein the non-transitory computer readable storage medium has further instructions encoded thereon that, when executed by a processor, cause the processor to:
- select an input feature from the input features for a single predictor that has a highest ranked attribute matching the label of a highest ranked sub-category;
- select additional features that are external to the list of features for the predictor that having a highest ranked attribute matching the label of the highest ranked sub-category; and
- re-train the predictor to include the additional features as input features.

* * * * *